US005217214A

United States Patent [19]

Takei

[11] Patent Number: 5,217,214

[45] Date of Patent: Jun. 8, 1993

[54] POSITIONING TABLE ASSEMBLY

[75] Inventor: Seiji Takei, Yokohama, Japan

[73] Assignee: Nippon Thompson Co., Ltd., Tokyo, Japan

[21] Appl. No.: 794,754

[22] Filed: Nov. 15, 1991

[30] Foreign Application Priority Data

Nov. 16, 1990 [JP] Japan ............ 2-308697

[51] Int. Cl.[5] ............ G01B 5/00

[52] U.S. Cl. ............ 269/73

[58] Field of Search ............ 269/73, 254 R, 60; 279/1 Q, 1 L; 33/568, 1 M, 573; 350/531; 356/344, 244

[56] References Cited

U.S. PATENT DOCUMENTS 4,630,942 12/1986 Tsumaki et al. ............ 269/73

4,667,415 5/1987 Barsky ............ 269/73

4,887,804 12/1989 Ohtsuka ............ 269/73

*Primary Examiner*—Robert C. Watson

*Attorney, Agent, or Firm*—Skjerven, Morrill, MacPherson, Franklin, & Friel

[57] ABSTRACT

A positioning table assembly includes a table slidably mounted on a pair of guide rails. The table is divided into a central section and a peripheral section which are connected through a connecting section. A traction shaft of a drive motor extends through a center slot formed in the central section. A piezoelectric device is mounted on the table to displace the central section relative to the peripheral section. When the piezoelectric device is energized, the central section is displaced to establish a frictional contact between the traction shaft in rotation and the central section so that the table may move in either direction depending on the direction of rotation of the traction shaft.

7 Claims, 3 Drawing Sheets

POSITIONING TABLE ASSEMBLY

BACKGROUND OF THE INVENTION

1. Field of the Invention

This invention generally relates to a positioning device, and, in particular, to a positioning table assembly for positioning a table at a desired location at high accuracy.

2. Description of the Prior Art

In a typical prior art positioning table assembly, a motor fixedly attached to a table has a shaft coupled to a ball screw so that the table may be moved in a desired direction depending on in which direction the motor is driven to rotate. However, such a structure tends to be bulky and since the motor mounted on the table has a relatively large weight which would tend to hinder an accurate control in positioning operation. Thus, there has been a need to develop a novel positioning table assembly compact in size and high in accuracy.

SUMMARY OF THE INVENTION

In accordance with the present invention, there is provided an improved positioning table assembly which generally includes a pair of guide rails extending in parallel spaced apart from each other, a table disposed between the pair of guide rails and a plurality of rolling members interposed between the table and each of the pair of guide rails to thereby provide a rolling contact between the table and each of the guide rails. The table basically has a two-part structure, i.e., a peripheral (or frame) section and a central (or core) section located inside the peripheral section, though the table may have an integral structure.

In a preferred embodiment, the table is formed with a plurality of peripheral slots along and near the four sides of the table to thereby divide the table into the peripheral section and the central section. Because of the provision of such peripheral slots, the core section may be displaced relative to the peripheral section, though the central section is integral with the peripheral section. At least one displacing means, preferably a piezoelectric device, is provided in at least one of these peripheral slots such that the central section may be displaced relative to the peripheral section when the piezoelectric device is energized.

The table is also formed with a center slot which extends in a desired orientation. A driving means, typically a motor shaft of a drive motor, extends through the center slot. Normally, there is no contact between the driving means and any wall surface of the center slot of the table. When the displacing means is energized to have the central section displaced relative to the peripheral section, the wall surface of the center slot is brought into frictional contact with the driving means, which is normally in rotation, so that the table is caused to move along the guide rails due to a driving force transmitted through a frictional contact between the driving means and the table.

When the piezoelectric device is deenergized, the central section is returned to its original position relative to the peripheral section under resiliency provided between a connection between the central and peripheral sections of the table, so that the driving means is decoupled from the wall surface of the center slot. Thus, the table is brought to a halt relative to the guide rails.

It is therefore a primary object of the present invention to obviate the disadvantages of the prior art as described above and to provide an improved positioning table assembly.

Another object of the present invention is to provide an improved positioning table assembly compact in size and high in accuracy.

A further object of the present invention is to provide an improved positioning table assembly simple in structure, easy to manufacture and thus low at cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
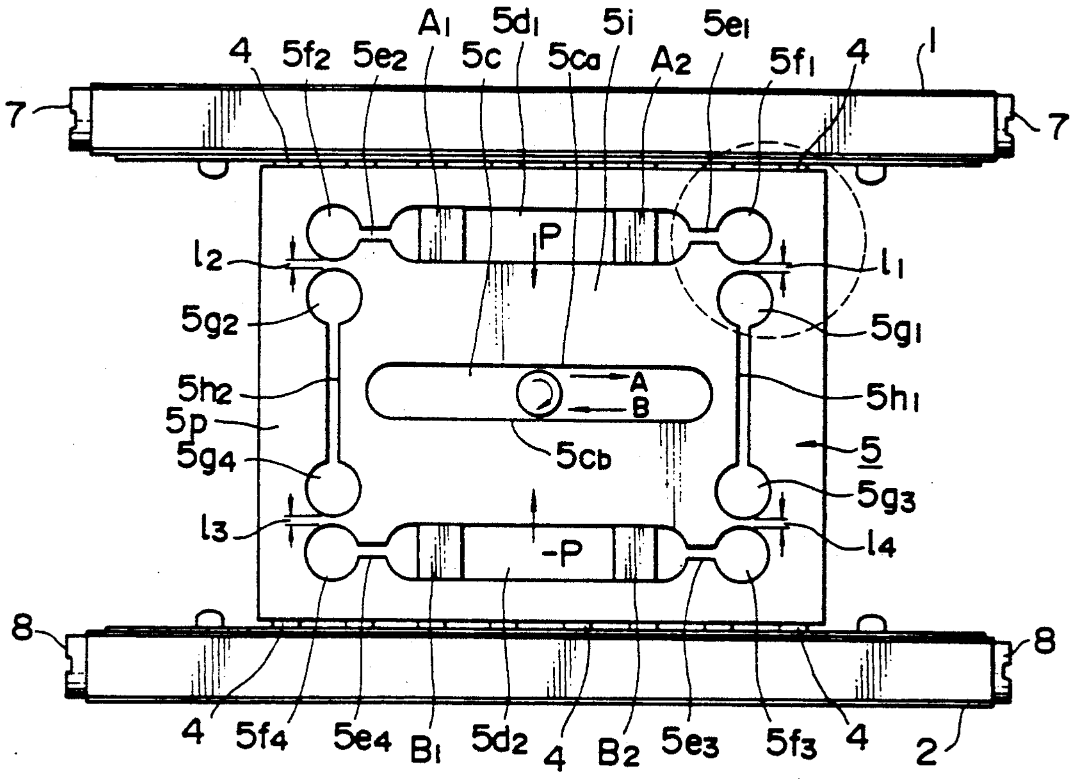
FIG. 1 is a schematic illustration showing in plan view a positioning table assembly constructed in accordance with one embodiment of the present invention.
Figure 2:
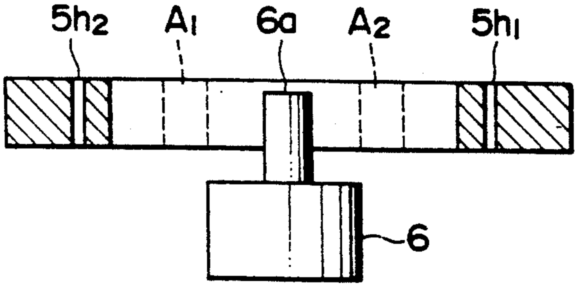
FIG. 2 is a schematic illustration showing in fragmentary cross sectional view a relative relationship between a table and a drive motor in the assembly of FIG. 1.

Referring to FIG. 1, there is schematically shown a positioning table assembly constructed in accordance with one embodiment of the present invention. The present positioning table assembly generally includes a pair of guide rails 1 and 2 extending in parallel as spaced apart from each other, a table 5 disposed between the pair of guide rails 1 and 2, and a plurality of rolling members 4 interposed between the table 5 and each of the guide rails 1 and 2. Therefore, the table 5 may move relative to the guide rails 1 and 2 in a direction parallel to the longitudinal direction of the rails 1 and 2.

Figure 5:
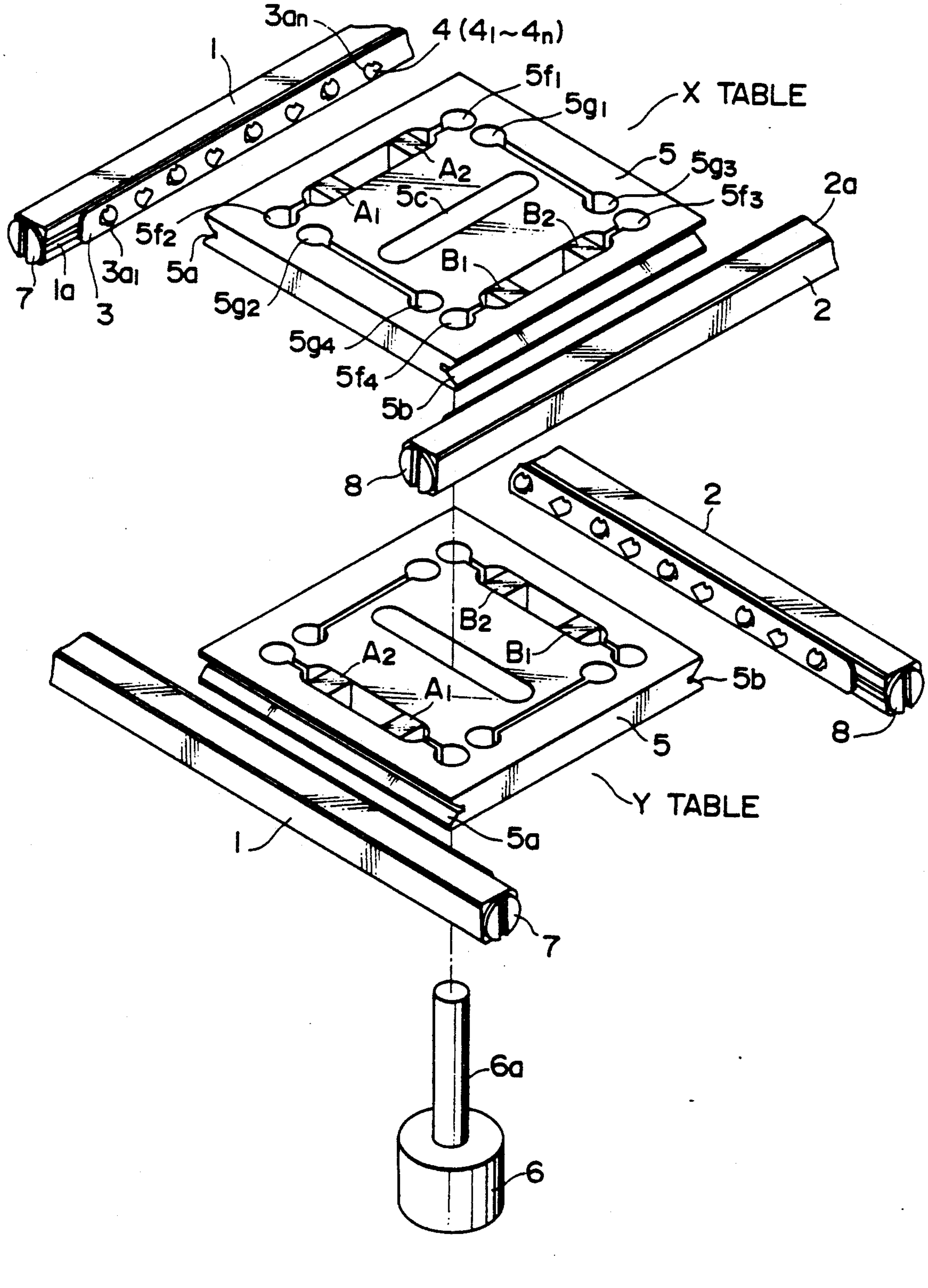
FIG. 5 is a schematic illustration showing in exploded view an X-Y positioning table assembly constructed in accordance with another embodiment of the present invention.

As best shown in FIG. 5, each of the guide rails 1 and is elongated in structure and formed with an outer guide groove *1a* and *2a*, respectively, on its inner surface. A plurality of rollers 4 ($4_1$-$4_n$) as rolling members are provided in the outer guide groove *1a* and *2a* and retained in position by a retainer plate 3. In the illustrated embodiment, the retainer plate 3 is provided with a plurality of windows *3a* ($3a_1$-$3a_n$) at a predetermined pitch and these windows 3 are so formed that the rollers 4 are partly exposed with the rotating axes of any two adjacent rollers 4 extend perpendicular to each other when viewed in a direction of the longitudinal axis of the guide rail 1 or 2. An end screw 7 or 8 is threaded into each end of the guide rails 1 and 2 to serve as a stopper against the plate retainer 3.

On the other hand, the table 5 has a generally square overall shape and its opposite side surfaces are formed with inner guide groove *5a* and *5b*, respectively, so that those portions of the rollers 4 which are exposed through the windows 3 may be received in the associated inner guide grooves 5*a* and 5*b* of the table 5. As a result, a rolling contact is provided between the table 5 and the guide rails 1 and 2 so that the table 5 may move relative to and along the guide rails 1 and 2 in any direction.

In the illustrated embodiment, the table 5 is in the shape of a plate and it is basically divided into two sections, i.e., a central or core section 5*i* and a peripheral section 5*p* which surrounds the central section 5*i*. In the structure shown in FIG. 1, the plate 5 is divided into central and peripheral sections 5*i* and 5*p* by providing a plurality of peripheral slots such as 5*d* and 5*h*. More in detail, the table 5 of FIG. 1 is provided with a pair of relatively wide peripheral slots 5*d*1 and 5*d*2 and a pair of relatively narrow peripheral slots 5*h*1 and 5*h*2. The relatively wide peripheral slot 5*d*1 is connected at its both ends to circular holes 5*f*1 and 5*f*2 through relatively narrow slots 5*e*1 and 5*e*2, respectively. Similarly, the relatively wide peripheral slot 5*d*2 is connected at its both ends to circular holes 5*f*3 and 5*f*4 through relatively narrow slots 5*e*3 and 5*e*4, respectively. On the other hand, the relatively narrow peripheral slot 5*h*1 is directly connected to circular holes 5*g*1 and 5*g*3 at its both ends. Similarly, the relatively narrow peripheral slot 5*h*2 is directly connected to circular holes 5*g*2 and 5*g*4 at its both ends. Therefore, the plate 5 is functionally divided into two sections, central section 5*i* and peripheral section 5*p*, which are still physically connected through four connecting sections having widths 11-14 which serve as resilient connections. With this structure, the central section 5*i* may be displaced relative to the peripheral section 5*p* and the central section 5*i* may come back to its original location due to the springy nature of the connecting sections.

The central section 5*i* of the table 5 is also formed with a center slot 5*c* which extends in parallel with the relatively wide slots 5*d*1 and 5*d*2 in the present embodiment. As shown in FIG. 1, a traction shaft 6*a* of a drive motor 6 extends into the center hole 5*c* in a direction perpendicular to the plane of the table 5. The width of the center slot 5*c* is so sized that it is slightly larger than the diameter of the traction shaft 6*a*. In a preferred embodiment, the wall surface of the center slot 5*c* is coated with or formed with an antislip member so as to provide an excellent frictional contact between the traction shaft 6*a* and the table 5. Thus, such an antislip member may be provided on both of or either one of the traction shaft 6*a* and the wall surface of the center slot 5*c*. If an excellent frictional contact can already be obtained between the traction shaft 6*a* and the wall surface of the center slot 5*c*, there is no need to provide such an antislip material. As will be described more in detail later, under a normal condition, the traction shaft 6*a* is not in contact with the wall surface of the center slot 5*c* and thus is decoupled from the table 5. However, when the central section 5*i* is displaced relative to the peripheral section 5*p*, the wall surface of the center slot 5*c* is brought into frictional contact with the traction shaft 6*a*, so that a driving force is transmitted to the table 5 from the motor 6.

As shown in FIG. 1, a pair of piezoelectric devices A1 and A2 are mounted on the table 5 as received in the elongated, relatively wide slot 5*d*1 as spaced from each other. Similarly, another pair of piezoelectric devices B1 and B2 are mounted on the table 5 as received in the elongated, relatively wide slot 5*d*2. These piezoelectric devices A and B expand and contract depending on whether they are energized or deenergized by a control circuit such as a microprocessor (not shown), and, thus, these device A and B serve as displacing means for displacing the central section 5*i* relative to the peripheral section 5*p*. In the illustrated embodiment, all of these piezoelectric devices A and B are identical in structure.

Therefore, if piezoelectric devices A1 and A2 are energized, they expand so that the central section 5*i* is displaced in a direction indicated by arrow P in FIG. 1 relative to the peripheral section 5*p* by causing the connecting sections 11 and 12 to deflect. As a result, an upper inner wall surface 5*ca* of the center slot 5*c* is brought into frictional contact with the traction shaft 6*a* which is in rotation in the direction indicated by the arrow. Accordingly, a driving force is transmitted from the traction shaft 6*a* to the table 5 which thus moves in a direction indicated by arrow A translationally as guided by the guide rails 1 and 2. Conversely, when piezoelectric devices B1 and B2 are energized, the central section 5*i* is caused to displace in the direction indicated by arrow −P. As a result, a lower inner wall surface 5*cb* of the center slot 5*c* is brought into frictional contact with the rotating traction shaft 6*a*, so that the table 5 as a whole is caused to move in a direction indicated by B as guided by the guide rails 1 and 2.

On the other hand, when both of piezoelectric devices A and B are energized at the same time, both of the upper and lower inner wall surfaces 5*ca* and 5*cb* are brought into frictional contact against the traction shaft 6*a* at the same time so that the table 5 is brought to a halt. In this sense, the central section 5*i* is also functionally divided into two sub-sections which can deform independently from each other. In order to provide such a function, the center slot 5*c* should be sufficiently long so that a half of the central section 5*i* may deflect independently from the other half. In this manner, by controlling the energization of piezoelectric devices A and B, the table 5 may be moved in any desired direction along the guide rails 1 and 2 or brought to a halt at any desired location.

Although not shown specifically because it is well known in the art, a light-emitting device and a light-receiving device is provided between the guide rails 1 and 2 and the table 5 so as to detect the location of the table 5 relative to the guide rails 1 and 2. A signal from a photosensor including the light-receiving device is supplied to the control circuit to determine the current location of the table 5 relative to the guide rails 1 and 2.

In operation, when none of the piezoelectric devices A and B are energized, no frictional contact exists between the traction shaft 6*a* and the wall surface of the center slot 5*c* so that the table 5 is not in motion. When it is desired to move the table 5 to a desired location along the guide rails 1 and 2, for example, piezoelectric devices A are energized so that the central portion 5*i* of the table 5 will be displaced in the direction indicated by P, which in turn causes the upper inner wall surface 5*ca* of the center slot 5*c* in frictional contact with the rotating traction shaft 6*a* and thus the table 5 is caused to move in the direction indicated by arrow A. On the other hand, if it is desired to move the table 5 in the direction indicated by arrow B, piezoelectric devices B are energized, so that the central section 5*i* is caused to displace in the direction indicated by arrow P. If it is desired to bring the table 5 to a halt, after supplying a stop signal to the motor 6 from the control circuit, both of piezoelectric devices A and B are energized to bring both of upper and lower wall surfaces 5ca and 5cb in contact with the traction shaft 6a.

Figure 3:
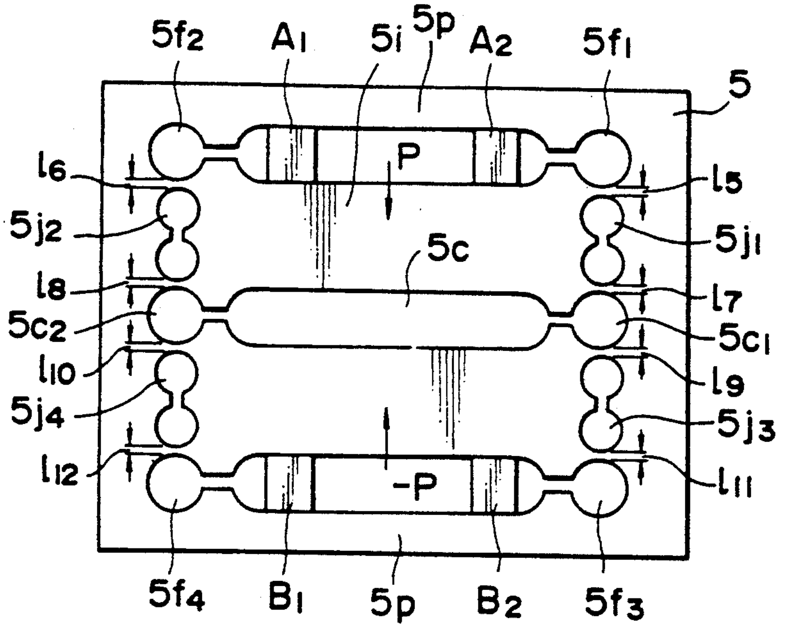
FIG. 3 is a schematic illustration showing in plan view a table constructed in accordance with another embodiment of the present invention.

FIG. 3 illustrates another embodiment of table 5 which is similar in many respects to the previously described table. In the present embodiment, the center slot 5c is connected to circular holes 5c1 and 5c2 at both ends through relatively narrow slots, respectively. As a result, the center slot 5c is similar in structure to both of the top and bottom peripheral slots. Then, a pair of circular holes 5j1 through 5j4 connected by a relatively narrow slot is provided between two adjacent circular holes. In this structure, there are provided eight narrow connecting sections 15 through 112 between the central section 5i and the peripheral section 5p and thus an upper half and a lower half of the central section 5i is divided functionally more distinctly.

In the structure shown in FIG. 3, when piezoelectric devices A are energized, the central section 5i or more specifically its upper half is displaced in a direction indicated by arrow P relative to the peripheral section 5p to establish a frictional contact between the traction shaft 6a (not shown in FIG. 3) and an upper wall surface of the center slot 5c. On the other hand, when piezoelectric devices B are energized, the central section 5i or more specifically its lower half is displaced in a direction indicated by arrow −P relative to the peripheral section 5p.

Figure 4:
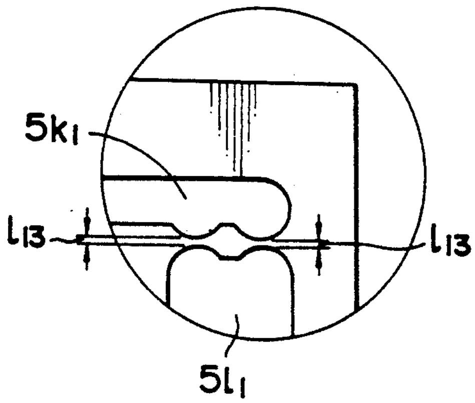
FIG. 4 is a schematic illustration showing in plan view on a somewhat enlarged scale the structure of a table constructed in accordance with a further embodiment of the present invention at a corner indicated by the dotted line circle in FIG. 1.

FIG. 4 illustrates a further embodiment of the table 5. This embodiment is basically the same in structure as the embodiment shown in FIG. 1 excepting a structure shown in FIG. 4. The circle shown in FIG. 4 corresponds to a circle indicated by the dotted line in FIG. 1. In the structure shown in FIG. 4, profiled holes 5k1 and 5l1 are provided in place of circular holes 5f1 and 5g1, respectively. Each of the profiled holes 5k1 and 5l1 has a heart shaped portion and thus the connecting section defined between these two profiled holes 5k1 and 5l1 has two constricted portions. Such a structure allows to provide an improved displaceability to the central section 5i.

FIG. 5 illustrates an X-Y positioning table assembly constructed in accordance with a still further embodiment of the present invention, in which positioning can be carried out along two axes. The structure shown in FIG. 5 can be easily constructed by placing a set of table and associated guide rails one on top of another set and orienting the first set with respect to the other such that the directions of movement of tables differ, preferably perpendicular to each other. Since each of the upper and lower sets of table and associated rails is identical in structure to the embodiment shown in FIG. 1, excepting the fact that the drive motor 6 is commonly used, no detailed explanation will be given as to the structure so as to avoid repetition of descriptions.

In operation, when it is desired to move X-table, in accordance with a command from a control circuit (not shown), piezoelectric devices A are energized, so that the central section 5i is displaced in a direction indicated by arrow P to establish a frictional contact between the rotating traction shaft 6a and the central section 5i, thereby moving the table 5 in a direction indicated by arrow A. On the other hand, if it is desired to move the table 5 in a direction indicated by arrow B, piezoelectric devices B are energized to have the central section 5i displaced in a direction indicated by arrow −P so that a frictional contact is established between the rotating traction shaft 6a and the central section 5i. If it is desired to bring X-table to a halt, a stop command is supplied to the drive motor 6 and then both of piezoelectric devices A and B are energized to bring the opposite wall surfaces of the center slot 5c in contact with the traction shaft 6a from both sides.

In a manner similar to that described above, Y-table which is located below X-table in FIG. 5 can also be moved in a desired location and brought to a halt at any desired location. In this manner, in the structure shown in FIG. 5, positioning can be carried out not only in one direction, X direction in this example, but also in another direction, Y direction in this example.

While the above provides a full and complete disclosure of the preferred embodiments of the present invention, various modifications, alternate constructions and equivalents may be employed without departing from the true spirit and scope of the invention. For example, in the above-described embodiments, use has been made of piezoelectric devices as a means for displacing the central section relative to the peripheral section; however, any other means, such as magnetostrictive materials, can also be used. Besides, in the above-described embodiments, use has been made of slots and holes to divide the table 5 into the central and peripheral sections; however, these central and peripheral sections may be manufactured separately and connected together through a connecting means, such as springs. Moreover, a relative motion mechanism between the table and the associated guide rails can be provided by any other structure, such as an endless circulating rolling contact mechanism or a sliding contact mechanism. Therefore, the above description and illustration should not be construed as limiting the scope of the invention, which is defined by the appended claims.

What is claimed is:

1. A positioning table assembly comprising:
   - a pair of guide rails extending in parallel spaced apart from each other;
   - a table disposed between said pair of guide rails, said table including a central section and a peripheral section which surrounds said central section and is connected to said central section through at least one connecting section such that said central section is displaceable relative to said peripheral section, said central section being formed with a center slot extending in a direction in parallel with a longitudinal axis of each of said guide rails;
   - a plurality of rolling members interposed between each of said pair of guide rails and said table to thereby provide a rolling contact between said guide rails and said table;
   - displacing means mounted on said table for displacing said center section relative to said peripheral section; and
   - driving means having a rotating portion which extends into said center slot.

2. The assembly of claim 1, wherein said table is in the form of a plate having four sides and formed with a plurality of peripheral slots along and near the four sides of said plate-shaped table, thereby dividing said table into said central and peripheral sections.

3. The assembly of claim 2, wherein said displacing means is provided in at least some of those peripheral slots which extend in parallel with the longitudinal axis of each of the guide rails.

4. The assembly of claim 3, wherein said displacing means extends transverse to the longitudinal axis of each of the guide rails.

5. The assembly of claim 4, wherein said displacing means includes at least one piezoelectric device.

6. The assembly of claim 1, wherein said driving means includes a drive motor having a traction shaft which defines said rotating portion.

7. The assembly of claim 1, said at least one connecting section comprises a plurality of peripheral slots and deflectable resilient narrow connections between the ends of said peripheral slots.

* * * * *